United States Patent [19]

Hartmann

[11] Patent Number: 4,574,430
[45] Date of Patent: Mar. 11, 1986

[54] FISH GUIDING DEVICE

[75] Inventor: Franz Hartmann, Bad Oldesloe, Fed. Rep. of Germany

[73] Assignee: Nordischer Maschinenbau Rud. Baader GmbH + Co KG, Lubeck, Fed. Rep. of Germany

[21] Appl. No.: 618,895

[22] Filed: Jun. 8, 1984

[30] Foreign Application Priority Data

Jun. 16, 1983 [DE] Fed. Rep. of Germany ....... 3321727

[51] Int. Cl.⁴ ...................... A22C 25/08; A22C 25/16
[52] U.S. Cl. ...................................................... 17/56
[58] Field of Search ................................ 17/56, 58, 61

[56] References Cited

U.S. PATENT DOCUMENTS 3,003,186 10/1961 Eriksen ................................. 17/58
3,925,846 12/1975 Leander ............................ 17/58 X

FOREIGN PATENT DOCUMENTS 1579387 7/1969 France .................................... 17/58
822265 10/1959 United Kingdom .................... 17/58

Primary Examiner—Willie G. Abercrombie
Attorney, Agent, or Firm—Edward F. Levy

[57] ABSTRACT

A fish guiding device is provided for guiding fish for processing in fish filleting machines particularly before and during the fish processing cut. The device includes guiding elements which engage the flanks of the fish and are spread apart by the latter in a counter-directed pivoting movement. The guiding elements are provided with a further degree of freedom in the form of a counter-directed swivelling movement about an axis extending substantially parallel to the fish path. Such movement enables the guiding elements to adapt to the flanks of the fish fed between them and positions the ventral fin in a precise position for removal even when the belly opening cut runs unsymmetrically.

1 Claim, 3 Drawing Figures

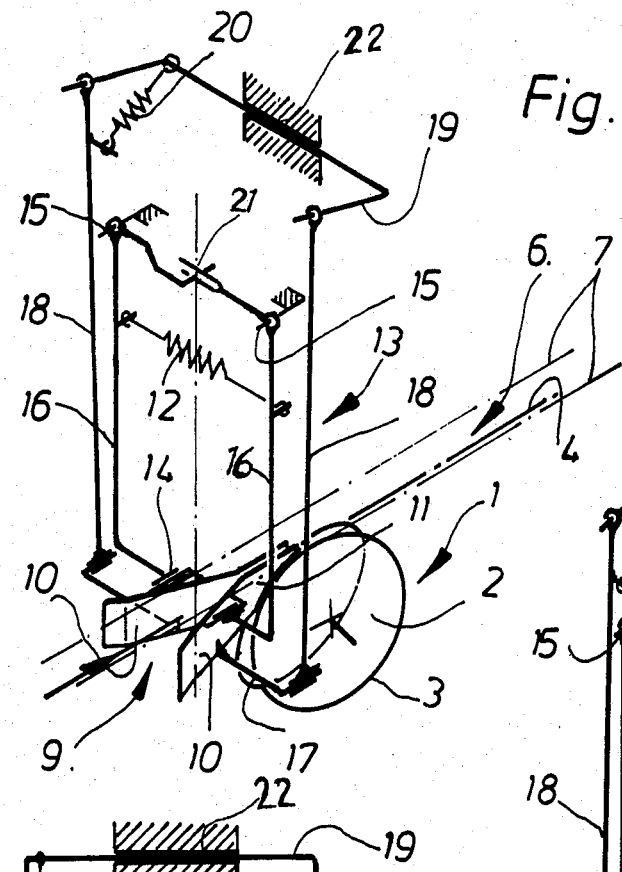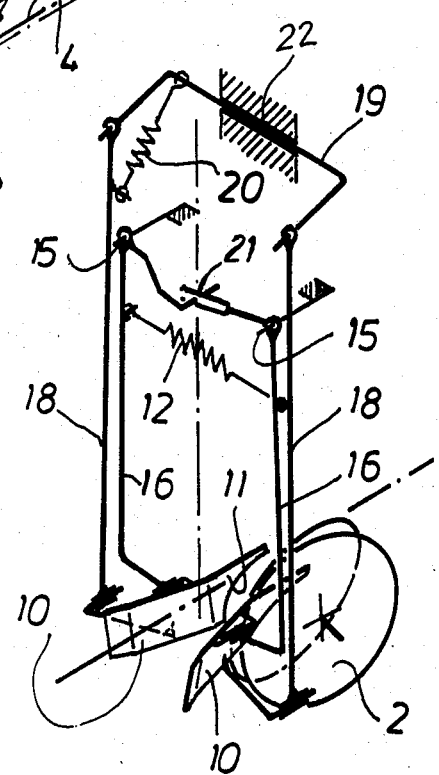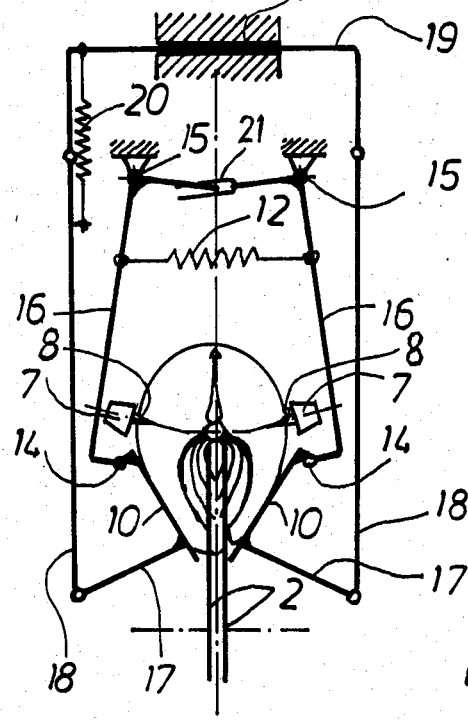

FISH GUIDING DEVICE

BACKGROUND OF THE INVENTION

1. Field of the invention

The invention concerns processing means for cutting free the fillets from the belly radii, these means comprising a pair of knives arranged essentially parallel to each other, a guiding device which is positioned in the region of the knives, supports the flanks of the fish and guiding elements which can be pushed apart synchronously in a counter-direction to each other by the fish to be processed, as well as a conveyor for moving the fish along the processing tools.

2. Description of Prior art

In the mechanical production of fillets from slaughtered fish, i.e. fish opened at their belly and gutted, it is important to carry out the corresponding working processes as economically as possible and to ensure a high product quality as well. In order to meet these requirements it is necesary to make the course of processing so precise that the necessity of additional trimming work, i.e. of manual correction to the fillets produced is at least greatly reduced and preferably becomes superfluous, and that the processing can be carried out with the least possible loss of yield.

Because it is forbidden to land cod-like fish such as cod, haddock, shellfish, etc. unslaughtered the fish are slaughtered on board directly after the catch. The belly cut for opening the belly cavity is carried out so that the abdominal cavity bag which, in fish of this kind, recedes back beyond the anus into the tail part is also opened so that the entrails can be removed more safely. For this purpose the belly opening cut is ended behind the anus in the region of the ventral fin directly behind the anus, the cut running, unsymmetrically, at least in the area of the ventral fin, i.e. close to, but laterally spaced from the same.

When fish prepared in such a manner are filletted it has been noted that the ventral fin usually remains on the fillet so that additional trimming work is necessary. This is because usually the guiding of the fish during the processing occurs by rigid guiding elements arranged in pairs and symmetrically to the path of the fish and formed mirror-inverted, which elements are each held resiliently under counter-directed synchronisation against the flanks of the fish (see e.g. French Patent No. 999 714). In such a handling the part of the fillet connected to the ventral fin, which part was already set loose by the belly opening cut, runs, due to its varying consistency, size, thickness and deformation through storage, through the machine along an undefined path so that a calculated and well defined separating of the ventral fin is not possible. In addition to the necessity of inspecting resp. trimming the fillets this uncertainty also leads to the inclusion of a skinning process into the mechanical processing course not being satisfactorily solvable since the ventral fin attached to fillet can effect a disturbance of the skinning process which becomes apparent in the form of skinning mistakes on the relevant fillet and in the impossibility of maintaining a continuous passage.

3. Objects of the Invention

It is therefore an essential object of the invention to ensure that fillets gained by using filletting machines are fin-free.

It is another object of the invention to achieve such fin-free fillets with the minimum possible loss of yield.

SUMMARY OF THE INVENTION

To achieve these objects there is provided in accordance with the invention a device to be integrated in fish filletting machines, which device serves to cut free the fillets from the belly radii (belly spokes) of fish and comprises a pair of knives arranged essentially parallel to each other, a guiding device which is positioned in the region of the knives, supports the flanks of the fish and guiding elements which can be pushed apart synchronously in a counter-direction to each other by the fish to be processed, as well as a conveyor for moving the fish along the processing tools, in which device the guiding elements are, in addition, mounted pivotally about axes directed essentially parallel to the conveying direction of the fish and means are provided for a counter-directed synchronization of the pivoting movement of the guiding elements about the axes.

Guiding elements arranged in a similar way can already be found in German Offenlegungsschrift No. 26 04 938. However, these guiding elements are associated to a cutting tool for severing the ribs and have the object of straightening the ribs by pressing the belly flaps against a guide surface so that the ribs can be removed by a straight cut. In order to achieve the highest possible yield this cut is carried out at a distance above the guide surface, which distance corresponds essentially to the thickness of the ribs. It has been found that the ventral fin cannot be included in this cut since it cannot be guided between the guide surface and the cutting plane due to the greater fillet flesh thickness in the area of the ventral fin.

The advantages which can be achieved by the invention lie essentially in that an extra grade of freedom is given to the guiding elements which enables their adaptation to the flank form of each fish running through them with the effect that, due to the friction between the belly flap and the corresponding guiding element, the belly flap is smoothed (straightened) and the ventral fin is brought into a path running between the knives of the belly filletting tool so that the tool can cut off the ventral fin.

BRIEF DESCRIPTION OF THE DRAWINGS

Other and further objects of the present invention will be apparent from the following description and claims and are illustrated in the accompanying drawings, which by way of illustration schematically show preferred embodiments of the present invention and the principles thereof and what now are considered to be the best modes contemplated for applying these principles. Other embodiments of the invention embodying the same or equivalent principles may be used and structural changes may be made as desired by those skilled in the art without departing from the present invention and the scope of the appended claims.

In the drawings

FIG. 1 shows a partial axonometric view of a device arranged according to the present invention, FIG. 2 is a partial axonometric view similar to FIG. 1, but showing the guiding elements spread apart and swivelled to position they would occupy with a fish therebetween, and FIG. 3 shows a cross-section through the device with a fish positioned between the guide elements.

DETAILED DESCRIPTION OF THE PREFERRED EMBODIMENT

In addition to further not-shown processing tools a belly-filletting tool 1 is arranged symmetrically to the vertical plane of symmetry of a filletting machine not shown in greater detail in the frame thereof also not shown. The belly-filletting tool 1 comprises a pair of circular knives 2 driven rotatingly in a suitable manner essentially parallel to each other and mounted to rotate. The cutting edges 3 of the circular knives 2 at their highest point are at a tangent to an imaginary horizontal plane through a fish path 4. Somewhat above this path there is positioned a pair of conveying belts 7 mounted on both sides of the fish path 4 and forming a conveyor 6. The belts 7 are driven in a suitable manner and arranged to yield against the force of a spring essentially parallel to the horizontal plane. The surfaces of the conveying belts 7 facing each other are provided with spikes 8. A guiding device 9 comprising a pair of guiding elements 10 arranged below the fish path 4 is positioned in the region in front of the belly filletting tool 1. At their rearward (downstream) ends 11 the guiding elements 10 are provided with arcuate recesses sized to permit lateral movement of the guiding elements relative to the circular knives 2 and together form an inlet wedge for the fish which can be pushed apart against the force of a spring 12. The guiding elements 10 are arranged on a synchronizing rod or lever arrangement 13 to pivot about axes 14 running essentially parallel to the fish path 4. The synchronizing rod arrangement 13 is mounted pivotally about pivotal axes 15 arranged mirror inverted to both sides of the fish path 4 and fixed to the above mentioned machine frame above the fish path 4. The synchronizing rod arrangement 13 is synchronized in an opposed direction by an engagement of elementary (single) rods 16 of the snychronizing rod arrangement 13, which engagement takes place by means of a pin-and-slot coupling 21 located between the pivotal axes 15. The guide elements 10 are each further provided with a bracket lever 17 on whose free ends levers 18 are arranged, which levers are connected with a forked lever 19 which is journalled in a bearing 22 mounted fixedly to the machine frame so as to enable a swivelling movement of the forked lever 19. The bracket lever 17, levers 18 and forked lever 19 cooperate to provide a second synchronizing arrangement by means of which the guiding elements 10 may swivel synchronously about the horizontal pivot axes 14 which are parallel to the fish path 4.

The method of operation of the device is the following:

A fish delivered to the conveyor 6 is held at its flanks by engagement of the conveying belts 7 somewhat above the plane of the backbone (spinal column), its plane of symmetry being in agreement with that of the filletting machine. The fish is then moved forward along the fish path 4, and arrives thus in the region of the guiding device 9 where it begins to push apart the guiding elements 10 against the force of the spring 12. The supporting surfaces resulting from the position of the guiding elements 10 below the fish path 4 and the cross-sectional shape of the fish lie below the axes 14 of each guide element 10 so that due to the force of a spring a torque affects the guiding elements 10, which torque causes a swivelling of the guiding elements 10. A second torque resulting from the weight of the bracket levers 17, of the levers 18 and of the fork arms of the forked lever 19 is directed against the first mentioned torque so that a state of equilibrium is achieved when the guiding elements are in a V-shaped position to each other. This state of equilibrium can be influenced, according to the consistency of the fish, by a spring 20 engaging at the fork lever 19 and preferably adjustable in strength so that it can be ensured that the belly seam and therefore the belly fin are guided in the plane of symmetry of the fish, i.e. arrive properly between the circular knives 2 of the belly filletting tool 1.

What is claimed is:

1. In a processing machine for processing fish having at least a backbone, fillet portions on both sides of said backbone, belly radii extending downwardly from said backbone and covered by said fillet portions, and outer flanks, processing means for cutting free said fillets from said belly radii of a fish, which means comprise
   a. a pair of knife means arranged essentially parallel to each other,
   b. a guiding device positioned in the region of said knife means for supporting the flanks of the fish and comprising guiding elements which are mounted to be pushed apart synchronously in a counter-direction to each other by said fish and
   c. conveyor means for moving the fish past said processing tools in a conveying direction, wherein
   d. said guiding elements are additionally mounted pivotally about axes aligned essentially parallel to said conveying direction of said fish, and
   e. means are provided for synchronising the pivoting movement of said guide elements in a counter-direction to each other.

* * * * *